Figure 1:
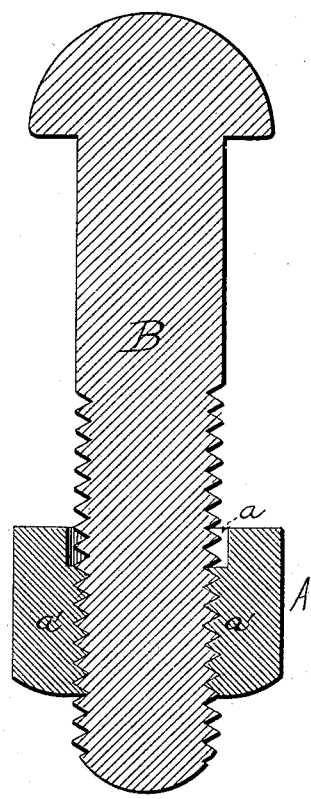

(No Model.)

F. H. HOWES.
BOLT AND NUT.

No. 341,146.  Patented May 4, 1886.

Witnesses:
R. C. Howes.
M. L. Adams.

Inventor:
Frank H. Howes,
Per Edw. E. Quimby,
Atty.

UNITED STATES PATENT OFFICE.

FRANK H. HOWES, OF EAST ORANGE, NEW JERSEY.

BOLT AND NUT.

SPECIFICATION forming part of Letters Patent No. 341,146, dated May 4, 1886.

Application filed December 26, 1885. Serial No. 186,678. (No model.)

*To all whom it may concern:*

Be it known that I, FRANK H. HOWES, of East Orange, New Jersey, have invented certain Improvements in Bolts and Nuts, of which the following is a specification.

The object of this improvement is to shield and protect from injury those convolutions of the thread of a screw-bolt which adjoin the convolutions engaged by the nut, to the end that if occasion arises to tighten the nut after its first application to the bolt there will be presented for engagement by the advancing nut-thread bolt-threads which retain their original symmetry of form, and which have not been mashed or distorted by collision with the interior of a washer, or with the wall of the aperture through which the bolt projects. Such distortion or injury to the bolt-threads frequently occurs in the case of railway-track bolts, and in other cases where the objects to which the bolt is applied are subjected to violent vibrations.

The invention is carried out by giving to the nut such additional thickness as may be required, and by boring or otherwise forming through the added material on the side of the nut which is intended to be presented toward the object through which the bolt is to be inserted a chamber which is in axial alignment with the hole tapped through the remaining portion of the nut, and which is of slightly larger diameter than the external diameter of the bolt-thread. The material added to the nut is thus made to constitute a hollow cylindrical shield, which surrounds and protects one or more of those convolutions of the bolt-thread which intervene between the object through which the bolt is inserted and the part of the nut which engages the bolt-thread, and this result is effected without any material diminution in the area of the bearing-surface of the nut against the opposed surface of the object through which the bolt projects.

The bearing-faces of nuts have heretofore been recessed, and the nuts have slit partly through the planes of their axes, for the purpose of causing them, by their bending or springing action when the nut was applied, to bite more firmly upon the bolt at their outer ends. In the present invention the nut is not permitted to have this bending or springing capacity, the added material serving as a pier, which affords a solid support for the nut, and transmits the resistant force to the object against which the nut is screwed in directions parallel with the axis of the nut, or, in other words, perpendicular to the surface against which the nut bears.

Figure 2:
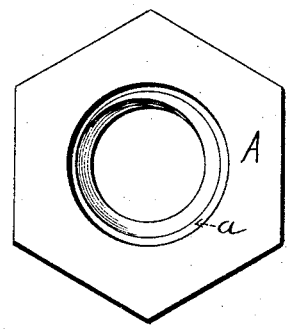

The accompanying drawings, illustrating a railroad-track bolt and nut containing the invention, are as follows:

Figure 1 is a central longitudinal section of a bolt and nut. Fig. 2 is an elevation of the inner face of the nut removed from the bolt.

The drawings represent a hexagonal nut, A, having a hole tapped through it for the engagement of the screw-thread of the bolt B. Upon the inner face of the nut a chamber, $a$, is provided, the diameter of which slightly exceeds the extreme diameter of the bolt-thread. In practice the nut is made of sufficiently increased thickness to provide for this chamber without unsuitably diminishing the thickness of the tapped portion $a'$ of the nut. On reference to the drawings it will be seen that two convolutions of the bolt-thread are shielded by the circular wall of the chambered portion of the nut. It will of course be understood that the thickness of the nut and the depth of the chambered portion may be varied, as desired, with reference to shielding either a greater or lesser number of convolutions of the bolt-thread.

What is claimed as the invention is—

The combination, as herein described, of a screw-bolt, B, with the nut A, provided upon its inner face with the chamber $a$, for the purpose of surrounding and shielding a prescribed number of convolutions of the bolt-thread when the nut is screwed home against the object through which the bolt is inserted.

FRANK H. HOWES.

Witnesses:
R. C. HOWES,
M. L. ADAMS.